United States Patent [19]

Helmsdorfer et al.

[11] Patent Number: 4,688,747
[45] Date of Patent: Aug. 25, 1987

[54] LOW VOLTAGE COMPUTER CABLE WALL APERTURE MOLDING

[75] Inventors: Robert J. Helmsdorfer, Wheaton; Todd Kemnitz, Deerfield; Robert J. Blaney, Hoffman Estates, all of Ill.

[73] Assignee: Midwest Innovations, Inc., Hoffman Estates, Ill. ; by said Todd Kemnitz

[21] Appl. No.: 822,525

[22] Filed: Jan. 27, 1986

[51] Int. Cl.4 .............................................. F16L 5/00
[52] U.S. Cl. ...................................... 248/56; 174/67; 220/241
[58] Field of Search .................. 248/56, 27.1, DIG. 6; 174/166, 167; 220/241, 242

[56] References Cited

U.S. PATENT DOCUMENTS

| | | | |
|---|---|---|---|
| 2,892,011 | 6/1959 | Glueckstein | 174/66 |
| 4,083,618 | 4/1978 | Busch | 174/67 X |
| 4,250,349 | 2/1981 | Bennett | 174/67 |
| 4,312,458 | 1/1982 | Stewart | 174/67 X |
| 4,343,411 | 8/1982 | Chesnut et al. | 220/242 |
| 4,508,933 | 4/1985 | Carvel | 174/67 |
| 4,569,458 | 2/1986 | Horsley | 248/27.1 X |

Primary Examiner—Ramon O. Ramirez
Attorney, Agent, or Firm—Andrew J. Bootz

[57] ABSTRACT

There is provided an improvement in wall aperture moldings and particularly in moldings for accommodating low voltage computer cables passing through wall of offices and the like and consisting of a wall mountable rectangular molding plate with a rectangular opening, and a removable plate cover which clips to the molding plate. The removable plate cover extends downwardly and outwardly from the molding plate to define a cable passage between the lower edge of said plate cover and molding plate. The final installation provides an asthetic appearance to the aperture molding.

In accordance with another feature, the molding plate may be provided with a gate slot to provide installation over pre-existing cables, and a gate plate is provided for closing the gate in the final installation.

8 Claims, 5 Drawing Figures

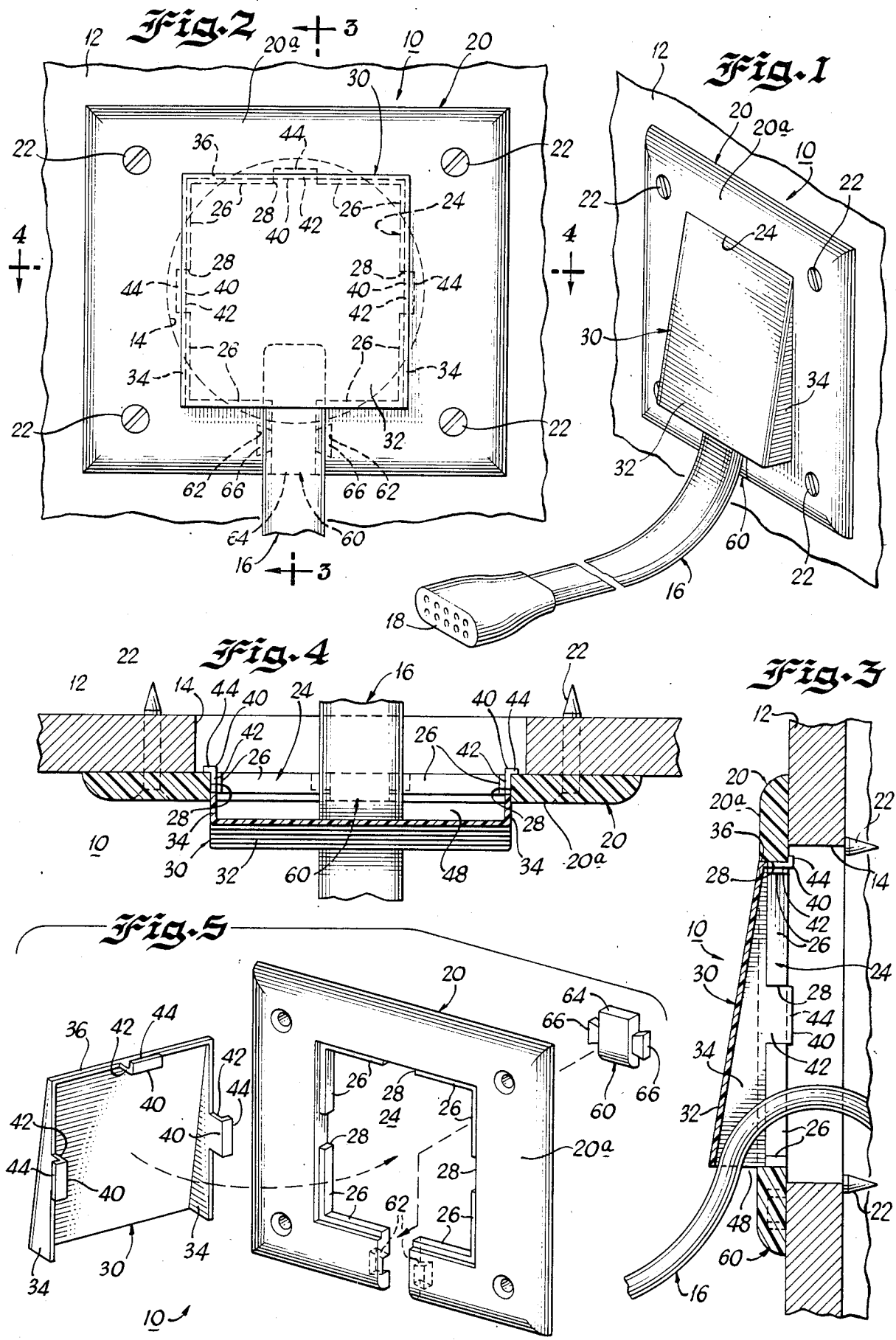

LOW VOLTAGE COMPUTER CABLE WALL APERTURE MOLDING

The present invention relates to improvements in wall aperture moldings and particularly in moldings accommodating the growing office, industrial, and domestic needs to conduct various low voltage computer cables through walls or other interspacial barriers in order to link various peripherals like video display terminals, printers, and modems to host computer systems which may be located in different physical spaces.

BACKGROUND OF THE INVENTION

In todays' state of the art, when computer peripheral devices are located in spaces other than that which the computer itself occupies, great care and planning must be given to the interspacial apertures used for conducting pre-made cables (those cables with connector ends already attached) which will be used to connect the peripherals to the computer. The most common method used is to ignore the savings in material and to simply conduct the cable along a baseboard, through a doorway, and down the baseboard on the other side of the wall until the cable has reached its desired position. This method results in an unsightly installation, and it is wasteful of material. Additionally, it presents the working space with a tripping hazzard and it is inflexible in that cables are generally fastened to the baseboard and are difficult to remove and reuse.

When cables are conducted through an interspacial barrier, the state of the art provides various types of one or two piece barrier mountable moldings or plates which cover the aperture which has been cut into the barrier to allow the computer cables to pass through the barrier. Some currently available products provide conduit which passes through the barrier and connects to the plates which have been mounted on either side of the penetrated barrier thus providing a dedicated channel through which the computer cable can pass. These products, when assembled and installed, generally reduce the barrier aperture to less than a one inch diameter. When the aperture diameter is reduced to less than two inches, installations must be pre-wired with the cable being conducted through the barrier first and the appropriate connectors being attached to the cable ends at a later time. This must be done because the most commonly used cable connectors are over two inches in width. This situation prohibits the use of premade cables as well as the removal of cable which have already been installed with connector ends attached. Smaller apertures also greatly increase the difficulty of conducting additional cable through the barrier, much the same as it is difficult to thread a needle. Some products come in two pieces which when apart have a large aperture. This facilitates the initial installation but does nothing to assist in the removal of existing pre-made cables or the subsequent installation of additional pre-made cables.

Another method used calls for wall mounted plates onto which a cable with its connector can be attached. This plate has another cable connected to its interior side which in turn can either be connected directly to the computer or to a network of cables which in turn is connected to the computer. This method is extremely inflexible in that it will accommodate only a fixed number of cables, generally one or two. It is also wasteful of connector parts in that it requires at least one additional connector per cable.

With the inflexibility and inadequacy of current technology, most installations generally consist of holes cut into barriers to allow cables to be conducted from one space to an adjoining space with no attempt made to close or mold the aperture after the cutting operation has been completed.

SUMMARY OF THE INVENTION

In accordance with the present invention, there is an improved apparatus and method for molding interspacial apertures which have been created to conduct pre-made computer cables from one space into an adjoining space. The present invention includes a barrier mountable rectangular aperture molding plate with a rectangular interior opening; and a molding plate cover removably secured onto the molding plate to cover the plate's rectangular interior opening while leaving an asthetically pleasing opening to allow passage of multiple computer cables.

In accordance with a particular feature of the invention, the molding plate is provided with a gate passage between the rectangular opening and the exterior of the molding plate to define a slot for permitting the passage of pre-existing cable; and a gate plate is provided which may be removed to accommodate slipping of a pre-existing cable into the rectangular opening of the molding plate, and which may be reinserted into the gate passage to close the gate passage.

The plate cover is designed to be removable to facilitate the reacquisition of the interior opening in the molding plate to enable additional pre-made cables to be conducted through the molding as well as to facilitate the removal of already installed pre-made cables. In a preferred embodiment, the plate cover snaps onto the molding plate.

In a preferred embodiment the plate cover extends outwardly and downwardly from the top edge of the rectangular opening, with its lower edge spaced apart from the lower edge of the rectangular opening in the molding plate, thereby defining a downwardly opening cable passage for the cables.

Advantageously, the present invention lends itself to the conducting of many pre-made cables through interspacial barriers, the removal of these same cables, as well as the conducting of pre-made cables through the same aperture at some later installation date. Additionally, the present invention lends itself to its installation even when cables have already been installed through the use of the removable gate plate. The molding plate cover allows the installer to close the aperture in order to give a final asthetic appearance to the aperture molding.

BRIEF DESCRIPTION OF DRAWINGS

FIG. 1 is a perspective view of the improved wall aperture molding attached to a wall or barrier, and showing the passage of a pre-made cable;

FIG. 2 is a front elevational view of the improved wall aperture molding according to the present invention;

FIG. 3 is a vertical section of the improved wall aperture molding of FIG. 1, taken along plane 3—3 of FIG. 2;

FIG. 4 is a horizontal section of the improved wall aperture molding of FIG. 1, taken along plane 4—4 of FIG. 2; and FIG. 5 is an exploded perspective view of the improved wall aperture molding.

DESCRIPTION OF A PREFERRED EMBODIMENT

Referring now to the drawings, there is illustrated an improved wall aperture molding 10 secured to a wall or barrier 12. The wall 12 is provided with a wall opening or wall aperure 14, best seen in FIGS. 3 and 4, for accommodating a pre-made computer or other cable 16. Typically such pre-made cable will have a pre-attached cable end 18, which may have a width in the area of two inches. The wall opening 14 may be in any desired shape, round or rectangular, such as to accept the insertion and passage of the larger cable end 18 therethrough.

The wall aperture molding 10 includes a molding plate 20, adapted to be secured over the wall opening 14 in any suitable manner, as with screws 22. The molding plate 20 is a generally flat plate, of molded plastic or other suitable material, rounded at its outer edges to provide an asthetically pleasing appearance, and provided with a central rectangular opening, here shown as a square opening 24. The rectangular opening 24 is designed to align with the wall opening 14, and upon installation of the molding plate 20 to the wall 12, the openings 14 and 24 will be aligned to allow for the passage of the cable 16 therethrough. The molding plate 20 is provided with internal ribs 26, FIG. 5, spaced inwardly from the front surface 20a of the molding plate 20, along the inner surface of the rectangular opening 24, for the seating of a plate cover 30. The ribs 26 extend around the interior of the rectangular opening 24, except for a plurality of slots 28, here shown as formed through the ribs 26 in the top and side surfaces of the rectangular opening 24.

The plate cover 30 is designed to cover the rectangular opening 24 from view, while permitting the passage of the cable 16 through the openings 14 and 24. More specifically, the illustrated cover plate 30 is formed of molded plastic or other suitable material, somewhat resilient, including a front surface portion 32, two side portions 34, and a top portion 36. The side portions 34 extend generally perpendicularly to the front surface portion 32, and the top portion 36 extends away from the front surface portion toward the molding plate. The side portions 34 are in the shape of truncated triangles, wider at the bottom than at the top; with the top portion 36 extending between the truncated upper ends of the side portions 34.

The plate cover 30 is adapted to be removably secured to the molding plate 20, and to this end, in the illustrated embodiment, the plate cover 30 is provided with a plurality of clips 40, extending from the side portions 34 and the top portion 36. Each clip 40 includes a body portion 42, best seen in FIG. 5, and a hook portion 44.

The plate cover 30 may be readily assembled with a molding plate 20. The side portions 34 and the top portion 36 fit within the rectangular opening 24 of the molding plate 20, and seat against the ribs 26 thereof. The clips 40 will pass through the slots 28 between the ribs 26, and the hook portions 44 of the clips 40 will resiliently snap and lock behind the molding plate 20, as best seen in FIGS. 3 and 4. The truncated side portions 34 of the plate cover serve to space the bottom edge of the plate cover 30 apart from the front surface 20a of the molding plate 20, to define a cable passage 48, FIGS. 3 and 4, between the molding plate 20 and the plate cover 30.

To permit the molding plate to be slipped over a pre-existing cable, the molding plate 20, in the illustrated embodiment, is provided with a gate passage 50, FIG. 5, in its lower surface, communicating between the rectangular opening 24 and the exterior of the molding plate 20. A gate plate 60 is provided for closing the gate passage 50 after insertion of the pre-existing cable. More specifically, the molding plate is provided with dovetail recesses 62 in its inner surface, communicating with the gate passage 50. The gate plate 60 includes a body portion 64 adapted to fill the gate passage 50, and opposed dovetails 66, FIG. 5, extending from the rear of the body portion 64. When assembled, the gate plate 60 closes the gate passage 50 of the molding plate 20.

The installation and operation of the improved wall aperture molding 10 according to the present invention is believed clear from the above detailed description. However, briefly, when it is desired to run a pre-made computer or similar cable through a wall or other barrier, an opening 14 is cut or formed in the wall. The molding plate 20, with the gate plate 60 inserted, may then be installed over the wall opening.

If the wall aperture molding is to be installed as a "fix" on pre-existing cables through a wall opening, the gate plate 60 is removed from the molding plate 20, and the pre-existing cables are slipped through the gate passage 50 of the molding plate into the rectangular opening 24 of the molding plate. The gate plate is then inserted into the gate passage 50, with the dovetails 66 of the gate plate 60 inserted in the dovetail recesses 62 of the molding plate 20. Since the dovetail recesses 62 do not extend through the molding plate 20, there is provided an asthetically pleasing appearance around the the gate passage 50, and upon installation of the molding plate 20 to the wall 12, the gate plate will be secured in place.

After the molding plate 20 has been secured to the wall, the cover plate 30 may be snapped or secured to the molding plate. The plate cover 30 is sufficiently resilient that it will snap into place, with the clips 40 locked behind the molding plate 20.

If it becomes desireable later to install additional pre-made cables through the wall or barrier 12, the cover plate 30 may be removed simply by squeezing the side portions 34 together, to unlock the clips 40 from the molding plate, and remove the plate cover. After the additional cables have been run through the wall opening and the rectangular opening 24 in the molding plate, the cover plate may be reinstalled simply by snapping it into place.

Since the cable passage 48 faces downardly, out of normal sight, providing an asthetically pleasing appearance.

What is claimed as new, and desired to be secured by Letters Patent of the United States, is:

1. A wall aperture molding for accommodating pre-made computer system cables, comprising:
    a. a barrier mountable rectangular aperture molding plate with a rectangular opening; and
    b. a removable plate cover defined by a top edge, a front surface, side portions and a lower edge, said plate cover being attachable to said molding plate and extending outwardly and downwardly from the upper edge of said rectangular opening with its lower edge spaced from the lower edge of said rectangular opening to define a downwardly opening cable passage.

2. A wall aperture molding as set forth in claim 1 above wherein said plate cover includes means removably securing the plate cover to the molding plate.

3. A wall aperture molding as set forth in claim 1 above wherein said molding plate and plate cover are formed of resilient material, and said plate cover is formed with clips which can snap behind said molding plate to attach said plate cover to said molding plate; and which can be resiliently deformed to disengage said clips from said molding plate and permit removal of said plate cover.

4. A wall aperture molding for accomodating pre-made computer system cables, comprising:
   a. a barrier mountable rectangular aperture molding plate with a rectangular opening; and
   b. a removable plate cover attachable to said molding plate and extending outwardly and downwardly from the upper edge of said rectangular opening with its lower edge spaced from the lower edge of said rectangular opening, said plate cover being formed with a front surface portion, two side portions, and a top portion, and said side portions being in the shape of truncated triangles, wider at their bottom, to space the bottom of said plate cover apart from the molding plate, thereby defining a downwardly opening cable passage.

5. A wall aperture molding for accommodating pre-made computer system cables, comprising:
   a. a barrier mountable rectangular aperture molding plate with a rectangular opening;
   b. a removable plate cover attachable to said molding plate and extending outwardly and downwardly from the upper edge of said rectangular opening with its lower edge spaced from the lower edge of said rectangular opening to define a cable passage;
   c. said molding plate being provided with a gate between the rectangular opening and the exterior of the molding plate to define a gate passage for permitting the passage of a pre-existing cable; and
   d. a removable gate plate forming a part of said wall aperture molding and inserted into the molding plate to close said gate passage.

6. A wall aperture molding as set forth in claim 5 above wherein said molding plate is formed with dovetail recesses in its rear surface communicating with said gate passage, and said gate plate is formed with dovetails inserted into said dovetail recesses, without extending through the molding plate.

7. A wall aperture molding for accommodating pre-made computer systems cables, comprising:
   (1) a barrier mountable rectangular molding plate, said molding plate having a rectangular opening adapted to align with a wall opening, and having a front and rear surface, and including:
      a. a plurality of internal ribs spaced inwardly from the front surface of the rectangular opening for the seating of a plate cover;
      b. a plurality of slots defined through said ribs along the top and sides of said rectangular opening;
      c. a gate passage formed in the bottom of said molding plate to accommodate the acceptance of pre-existing cables and communicating between the rectangular opening and the exterior of the molding plate, said molding plate having dovetail recesses in its rear surface communicating with the gate passage;
   (2) a removable plate cover attached to said molding plate and including:
      a. a front surface portion;
      b. two side portions of generally truncated triangular shape extending from the front portion generally perpendicularly toward said molding plate, with the larger side of the truncated triangle being downwardly;
      c. a top portion extending generally inwardly from the front surface toward the molding plate; and
      d. a plurality of clips extending from the top and side portions of the plate cover, passing through the slots in the molding plate, and locked with the molding plate;
   said plate cover being seated against the ribs of said molding plate and extending outwardly therefrom whereby the front surface of the plate cover extends outwardly and downwardly to define a cable passage between the lower edge of the plate cover and the molding plate for the passage of a cable; and
   (3) a gate plate in said gate passage, formed with:
      a. a body portion fitted within the gate passage in the molding plate; and
      b. dovetails extending from the body portion at the rear thereof, fitted into the dovetail recesses of the molding plate.

8. A wall aperture molding for accommodating pre-made computer system cables, comprising:
   a. a barrier mountable aperture molding plate with a square opening; and
   b. a removable plate cover attachable to said molding plate and being formed of a front surface and two side surfaces, said side surfaces being in the shape of truncated triangles, wider at one end, spacing said one end of said plate cover apart from the adjacent edge of said square opening defining a cable passage,
   said plate cover may be rotated relative to the molding plate to position the cable passage selectively upwardly, downwardly, and to either side.

* * * * *